United States Patent
Zhang et al.

(10) Patent No.: US 8,954,053 B2
(45) Date of Patent: Feb. 10, 2015

(54) METHOD FOR LINK ADAPTATION AND APPARATUS THEREOF

(75) Inventors: Qinghong Zhang, Guangdong Province (CN); Hang Li, Guangdong Province (CN)

(73) Assignee: ZTE Corporation, Shenzhen, Guandong Province (CN)

( * ) Notice: Subject to any disclaimer, the term of this patent is extended or adjusted under 35 U.S.C. 154(b) by 593 days.

(21) Appl. No.: 13/258,578

(22) PCT Filed: Jun. 30, 2010

(86) PCT No.: PCT/CN2010/074869
§ 371 (c)(1),
(2), (4) Date: Nov. 25, 2011

(87) PCT Pub. No.: WO2011/079612
PCT Pub. Date: Jul. 7, 2011

(65) Prior Publication Data
US 2012/0184220 A1    Jul. 19, 2012

(30) Foreign Application Priority Data
Dec. 29, 2009   (CN) .......................... 2009 1 0238810

(51) Int. Cl.
*H04W 24/00*   (2009.01)
*H04B 17/00*   (2006.01)
*H04B 7/216*   (2006.01)
*H04L 1/00*    (2006.01)
*H04L 1/20*    (2006.01)

(52) U.S. Cl.
CPC ............... *H04L 1/0021* (2013.01); *H04L 1/20* (2013.01); *H04L 1/0003* (2013.01); *H04L 1/0009* (2013.01)
USPC ........................ 455/423; 455/67.13; 370/342

(58) Field of Classification Search
CPC combination set(s) only.
See application file for complete search history.

(56) References Cited

U.S. PATENT DOCUMENTS

| 6,426,971 | B1 | 7/2002 | Wu et al. |
| 7,191,381 | B2 | 3/2007 | Gesbert et al. |
| 2002/0012332 | A1* | 1/2002 | Tiedemann et al. .......... 370/335 |
| 2002/0101840 | A1* | 8/2002 | Davidsson et al. .......... 370/330 |
| 2004/0141460 | A1 | 7/2004 | Holtzman et al. |
| 2005/0054296 | A1* | 3/2005 | Chuang et al. ............... 455/63.1 |
| 2006/0062284 | A1* | 3/2006 | Li et al. ......................... 375/148 |
| 2007/0072600 | A1* | 3/2007 | Cho et al. ...................... 455/423 |
| 2007/0189260 | A1* | 8/2007 | Chang .......................... 370/342 |
| 2007/0230589 | A1* | 10/2007 | Lozano ......................... 375/260 |
| 2008/0043773 | A1* | 2/2008 | Ihori ............................. 370/460 |
| 2008/0232340 | A1* | 9/2008 | Wan et al. ..................... 370/343 |
| 2009/0310550 | A1 | 12/2009 | Medapalli et al. |

* cited by examiner

*Primary Examiner* — Andrew Wendell
*Assistant Examiner* — Cindy Trandai
(74) *Attorney, Agent, or Firm* — Ling Wu; Stephen Yang; Ling and Yang Intellectual Property

(57) ABSTRACT

A method for link adaptation includes: classifying a radio channel; setting a set of link adaptation modes; and selecting a corresponding link adaptation mode according to a radio channel type. An apparatus for link adaptation includes: a classification module for performing a classification on a radio channel; a setting module for setting a set of link adaptation modes; and a mode selection module for selecting a corresponding link adaptation mode from the setting module according to a radio channel type of the classification. The present invention accordingly selects effective link adaptation modes in accordance with different types of radio channels, and is able to ensure to implement the maximum system throughput in different fading channels and maintain the stable and reliable link quality.

8 Claims, 4 Drawing Sheets

Flat channel

Fast fading channel

Slow fading channel

METHOD FOR LINK ADAPTATION AND APPARATUS THEREOF

TECHNICAL FIELD

The present invention relates to wireless communication systems, and more particularly, to a link adaptation technique.

BACKGROUND OF THE RELATED ART

In wireless communication systems, since the radio channel is complex and there is no fixed rules to follow, in order to implement the maximum throughput of the wireless communication systems, wireless communication systems are expected to be able to automatically adjust the transmission rate according to the channel condition change, namely the link adaptation technique. The conventional method for link adaptation is taking the latest channel quality measurement result as a basis of selecting the future link rate.

SUMMARY OF THE INVENTION

In the prior art, the conventional method for link adaptation is taking the latest channel quality measurement results as a basis of selecting the future link rate, and this method has the following problems:

the channel quality measurement results always contain measurement errors and random interference affects, namely the measurement results cannot accurately reflect the actual channel conditions;

radio channel conditions randomly change with the change of the time, and that is to say that the past measurement results cannot completely reflect the future channel conditions.

In view of this, the technical problem to be solve in the present invention is to provide a method and an apparatus for link adaptation, which are able to ensure the maximum throughput of the system implemented in different fading channels and maintain the stable and reliable link quality.

To solve the above technical problem, one aspect of the present invention is to provide a method for link adaptation, and the method comprises:

classifying a radio channel;
setting a link adaptation mode set; and
selecting a corresponding link adaptation mode according to a radio channel type.

In the step of classifying the radio channel, the radio channel is classified based on a time-variant characteristic of the radio channel.

In the step of classifying the radio channel, the radio channel is classified into:

a flat channel, a slow fading channel and a fast fading channel; or the slow fading channel and the fast fading channel; or the slow fading channel, the fast fading channel and a mutant channel.

The link adaptation mode set includes: an instantaneous value prediction mode, a historical value prediction mode, a statistical quantile prediction mode and a mutation processing mode.

The step of selecting the corresponding link adaptation mode according to the ratio channel type comprises: determining a current radio channel type by analyzing historical measurement information of the radio channel, and selecting the corresponding link adaptation mode from the link adaptation mode set according to the current radio channel type.

After the step of selecting the corresponding link adaptation mode according to the radio channel type, the method also comprises: obtaining channel prediction information at a to-be scheduling time according to the radio channel type and the corresponding link adaptation mode, and obtaining a link rate matching with the channel prediction information at the to-be scheduling time.

Another aspect of the present invention also provides an apparatus for link adaptation, which comprises:

a classification module, which is configured to classify a radio channel;

a setting module, which is configured to set a link adaptation mode set; and a mode selection module, which is configured to select a corresponding link adaptation mode from the setting module according to a radio channel type in the classification.

The classification module is configured to perform the classification on the radio channel based on a time-variant characteristic of the radio channel.

The classification module is configured to classify the radio channels into:

a flat channel, a slow fading channel and a fast fading channel; or the slow fading channel and the fast fading channel; or the slow fading channel, the fast fading channel and a mutant channel.

The link adaptation mode set includes: an instantaneous value prediction mode, a historical value prediction mode, a statistical quantile prediction mode and a mutation processing mode.

The mode selection module is configured to select the corresponding link adaptation mode according to the radio channel type in a following way:

determining a current radio channel type by analyzing historical measurement information of the radio channel, and selecting the corresponding link adaptation mode from the link adaptation mode set according to the current radio channel type.

The apparatus also comprises:

a channel learning module, which is configured to analyze and process the historical measurement information of the radio channel to obtain a the current radio channel type; and a link rate determination module, which is configured to: obtain the channel prediction information at a to-be scheduling time according to the radio channel type and the corresponding link adaptation mode, and select a link rate matching with the channel prediction information at the to-be scheduling time.

With the technique in the present invention, an effective link adaptation processing mode can be selected specifically according to different radio channel types, which is able to ensure to implement the maximum system throughput in different fading channels and to maintain a stable and reliable link quality.

BRIEF DESCRIPTION OF DRAWINGS

The drawings described herein is used to provide a better understanding of the present invention and forms a part of this application, the illustrative examples of the present invention and their descriptions are used to explain the present invention rather than forming the improper restriction on the present invention. In the drawings.

PREFERRED EMBODIMENTS OF THE PRESENT INVENTION

The specific embodiments of the present invention will be illustrated in detail with reference to drawings and examples.

Figure 1:
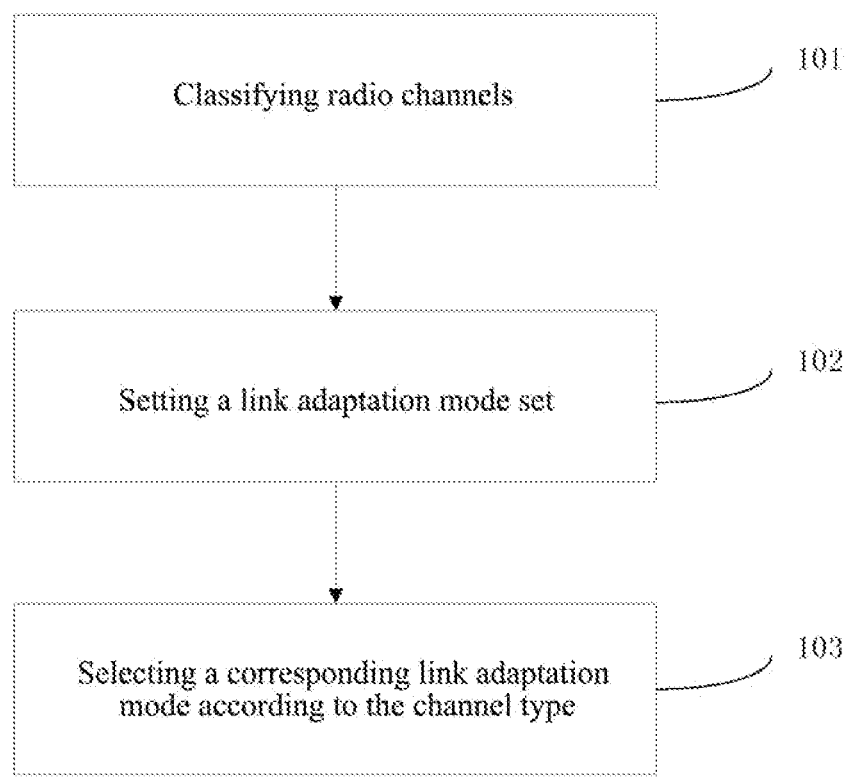
FIG. 1 is a flow chart of the method for link adaptation in accordance with the present invention.

The basic idea of the method for link adaptation in accordance with the present invention is shown in FIG. 1, which comprises:

step 101, the radio channels are classified;
step 102, a link adaptation mode set is set;
step 103, a corresponding link adaptation mode is selected according to the radio channel type.

EXAMPLE 1

Figure 2:
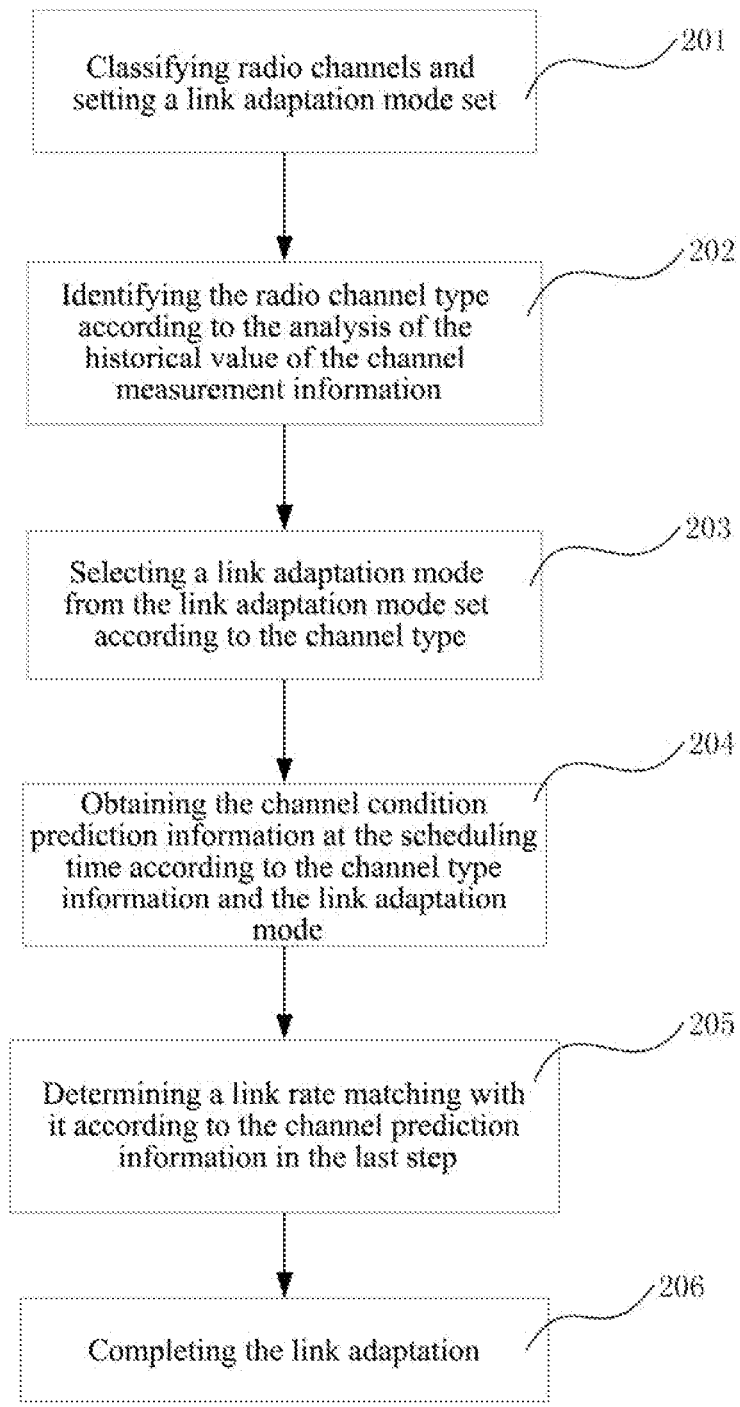
FIG. 2 is a flow chart of the method for link adaptation in accordance with the example 1 of the present invention.

As shown in FIG. 2, this example comprises the following steps of:

step 201, the radio channels are classified, and the corresponding link adaptation mode set is set.

Figure 3:
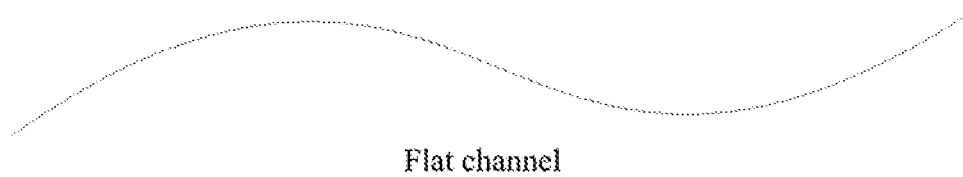
FIG. 3 is a schematic diagram of the classification of the radio channels.
Figure 3:
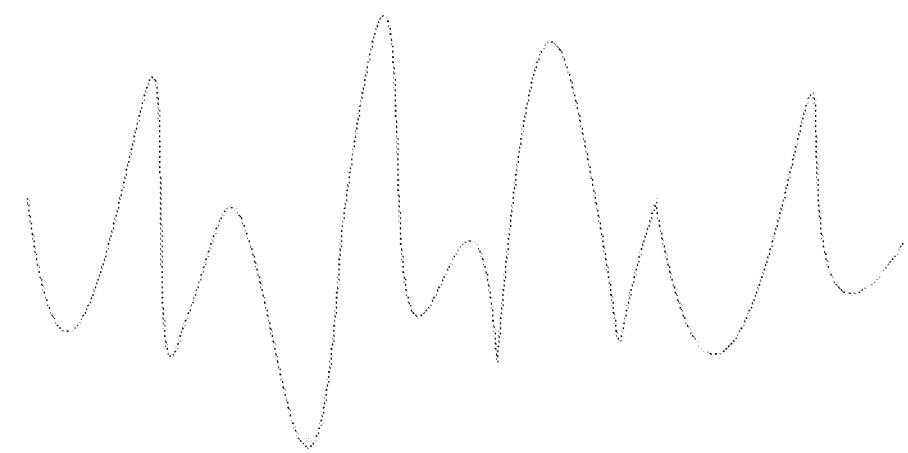
Figure 3:

Specifically, in this example, the radio channels are classified into three types according to the time-variant characteristics of the radio channels, and as shown in FIG. 3, the three types of radio channels are: flat channels, slow fading channels and fast fading channels;

then further a corresponding link adaptation mode set is set according to the channel fading types;

the corresponding link adaptation mode set includes: an instantaneous value prediction mode, a historical value prediction mode and statistical quantile prediction mode, wherein:

the instantaneous value prediction mode refers to take the latest channel measurement result as a basis to select a link rate at the channel scheduling time.

The historical value prediction mode refers to use the curve fitting method to predict the channel conditions at the to-be scheduling time according to the historical channel measurement results for use by selecting the link rate.

The statistical quantile prediction mode refers to take a certain quantile of the cumulative distribution function of the historical measurement results as the basis to select the link rate at the to-be scheduling time. For example:

(1) flat channels: in the instantaneous value prediction mode, and predictable, that is, the prediction error is in the acceptable range;

suppose:

the channel measurement result at the time t is denoted as $SINR(t)$, the current time is denoted as $t0$, the to-be scheduling time is $t0+n$, where n is the sum of the system processing delay and the air interface transmission delay; the latest measurement result obtained at the current time is $SINR(tx)$, and $tx \leq t0$, therefore: the instantaneous value prediction result $SINR\_estimate(t0+n)$ is $SINR\_estimate(t0+n)=SINR(tx)$, the estimation error at the time t is denoted as $Err(t)$, then:
$Err(t)=|SINR\_estimate(t)-SINR(t)|$ The predictable (estimable) probability is expressed as:

the probability function $P(Err(t) \leq Error\_threhold | t=t0-w+1, t0-w+2, \ldots, t0) \geq P1, 0 \leq P1 < 1, w \geq 0$, where Error_threshold is the estimation error threshold, when $Err(t) \leq Error\_threhold$, it indicates that the estimation at the time t is correct, otherwise, it indicates that the estimation is wrong, and the smaller the Error_threshold is, the higher the estimation precision is, otherwise, the estimation precision is lower; P1 denotes the probability threshold of the correct estimation, and that is, the probability of correct estimation is P1. When the probability of correct estimation is larger than the threshold P1, it indicates that the channel is estimable in this prediction mode (or predictable). Where, w indicates the statistical time window length, and the smaller the w is, the lower the switching between the channel modes is, the more accurate the statistical result is, the faster the switching between the development modes is and the lower the judgment precision is.

(2) Slow fading channels: in the historical value prediction mode, and predictable, that is, the prediction error is in the acceptable range.

The concept of predictability is as the above description and is not repeated herein;

the historical value prediction mode refers to: use the historical channel measurement results $SINR(t0-w'+1)$, $SINR(t0-w'+2), \ldots, SINR(t0)$, use the selected basis function $f(t)$ to perform the curve fitting on $SINR(t), t=t0-w, +1, t0-w, +2, -, t0$ to obtain the mathematical expression of $f(t)$, so that $f(t)=SINR(t), t=t0-w'+1, t0-w'+2, \ldots, t0$. The historical value prediction result $SINR\_estimate(t)=f(t)$. Where w' denotes the number of historical measurement results; $f(t)$ can be any basis functions such as the trigonometric function, the power function, the logarithmic function as well as the polynomial function and so on.

(3) Fast Fading Channels: other cases, that is, unpredictable;

those are unpredictable by the above two methods are determined as the fast fading channels, and the corresponding link adaptation mode is the statistical quantile prediction mode;

the statistical quantile prediction mode is the mode applying the probability distribution function:

$P(x)=P(SINR(t)<x|t=t=t0-w''+1, t0-w''+2, \ldots, t0)$, the quantile at the point of alpha of the $P(x)$ is taken as the statistical quantile prediction result $SINR\_estimate(t)$, that is, $SINR\_estimate(t)=P^{-1}(alpha)$, and $P^{-1}(x)$ is the inverse function of $P(x)$; $0 \leq alpha \leq 1$, the larger the alpha is, the higher the rate is, and the worse the reliability is, otherwise, the lower the rate is, and the better the reliability is;

step 202, the fading type of the radio channel is obtained according to the analysis of the historical measurement information of the radio channel, and that is, the fading type of the radio channel is obtained via the channel learning.

Step 202 comprises:

202.1, the historical measurement results are de-noised, and a general de-noising way can be used, for example the filtering way or the sliding window average way;

202.2 N historical measurement results are observed, and if the channel is predictable in the instantaneous value prediction mode, the channel is a flat channel; if the channel is predictable in the historical value prediction mode, the channel is a slow fading channel; otherwise the channel is a fast fading channel.

Step 203, a link adaptation mode is selected from the link adaptation mode set according to the fading type of the radio channel obtained in step 202;

if the channel is a flat channel, the instantaneous value prediction mode is selected; if the channel is a slow fading channel, the historical value prediction mode is selected; and if the channel is a fast fading channel, the statistical quantile prediction mode is selected.

Step 204, the channel condition prediction information at the to-be scheduling time point is obtained according to the radio channel type and link adaptation mode;

the channel condition prediction information might include the Signal Interference Noise Radio (SINR), and the Block Error Rate (BLER), and so on;

it is assumed that the latest historical measurement value is SINR(t), and measurement value at the to-be scheduling time is SINR-estimate(tx);

the channel condition prediction information corresponding to the channel classification results is as follows:

in flat channels: SINR estimate(tx)=SINR(t);
in slow fading channels: SINR estimate(tx)=f(tx);
in fast fading channels: SINR_estimate(tx)=$P^{-1}$(tx).

step 205, the matching link rate is obtained according to the channel condition prediction information obtained in step 204;

it is assumed that the channel SINR prediction result is SINR1 and the service BLER requirement is BLER1; the maximum rate that can be reached by the link in the conditions of SINR=SINR1 and BELR=BLER1 is the Modulation Code Scheme 1 (MCS1), therefore, the output result in this step is MCS1.

Step 206, the link adaptation process is complete.

EXAMPLE 2

In addition, the present invention can further classify the radio channels into two types according to the time-variant characteristics of the radio channels, namely: slow fading channels and fast fading channels. The processing method is as the example 1 and is not repeated herein.

EXAMPLE 3

In addition, the present invention can further classify the radio channels into: fast fading channels, slow fading channels and mutant channels according to the time-variant characteristics of the radio channels.

Wherein, the method for processing the fast fading channels and the slow fading channels is as the example 1 and is not repeated herein.

For a mutant channel, the channel is suddenly good or bad, the corresponding link adaptation mode is the mutation processing mode.

For the mutant channel, the mutant processing mode is applied, and the mutation processing mode refers to: clear the historical information, use the initial default channel prediction way which might use any one of the historical value prediction mode or the instantaneous value prediction mode, and the specific selection is determined according to the data reliability requirements.

EXAMPLE 4

Based on the same inventive concept, the example of the present invention also provides an apparatus for link adaptation, since the principle of the apparatus for solving the problem is similar to the method for link adaptation, the implementation of the apparatus can refer to the implementation of the method, and the overlaps are not repeated herein.

Figure 4:
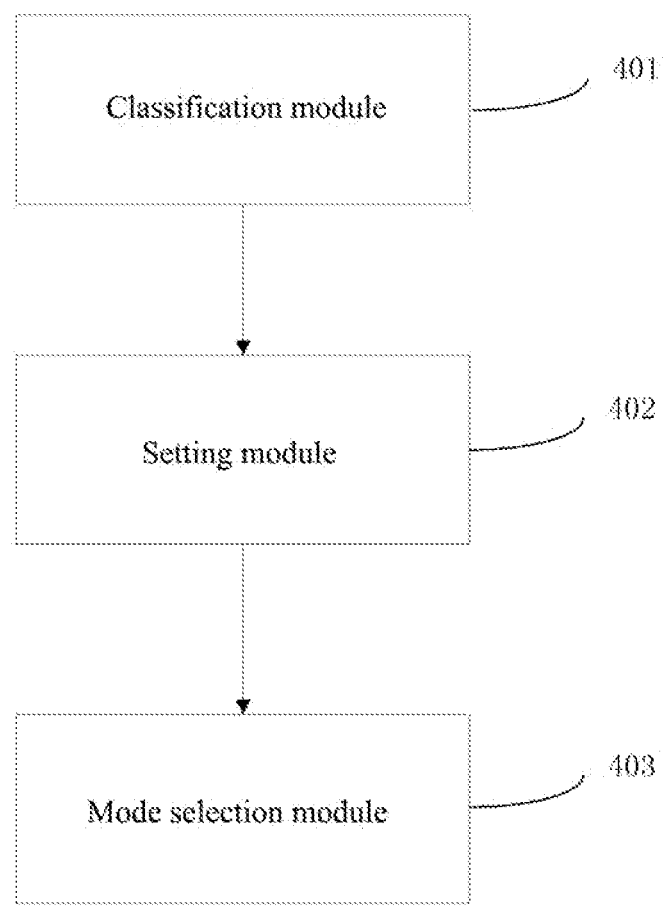
FIG. 4 is a block diagram of the apparatus for link adaptation in accordance with the present invention.

FIG. 4 shows a schematic diagram of the structure of the apparatus for link adaptation in accordance of the present invention, and as shown in FIG. 4, the apparatus comprises a classification module, a setting module and a mode selection module, wherein the classification module 401 is configured to perform a classification on the radio channels;

the setting module 402 is configured to set a link adaptation mode set;

the mode selection module 403 is configured to select the corresponding link adaptation mode from the setting module according to the radio channel type in the classification.

Preferably, the apparatus for the link adaptation in the present invention also comprises a channel learning module and a link rate determination module, wherein the channel learning module is configured to analyze and process the historical measurement information of the radio channels to obtain the current radio channel type;

the link rate determination module is configured to obtain the channel prediction information at the to-be scheduling time according to the radio channel type and the corresponding link adaptation mode, and to select the matching link rate.

It can be understood by those skilled in the art that some or all steps in the above mentioned method can be fulfilled by instructing the relevant hardware with a program, and said program is stored in a computer readable storage medium such as the read only memory, the magnetic disk or the optical disk. Optionally, some or all steps in the above mentioned examples can be implemented with one or more integrated circuits. Correspondingly, each module/unit in the above mentioned examples can be implemented in the form of hardware or in the form of software function module, or their combinations.

The principle of the present invention is illustrated in detail in the above description, however, the description is only a plurality of examples illustrated for understanding the present invention rather than the restriction of the protection scope of the present invention. For those skilled in the art, various corresponding modifications and transformations can be made according to the present invention without departing from the spirit and essence of the present invention, and such modification or transformations should fall into the protection scope of the appended claims of the present invention.

Industrial Applicability

With the technique in the present invention, an effective link adaptation processing mode can be selected specifically according to different radio channel types, which is able to ensure the maximum system throughput in different fading channels and to maintain a stable and reliable link quality.

What is claimed is:

1. A method for link adaptation, comprising:
   classifying radio channels into different channel types by an apparatus;
   setting a set of link adaptation modes by the apparatus; and
   selecting, by the apparatus, a corresponding link adaptation mode for a radio channel from the set of link adaptation modes according to the channel type of the radio channel;
   wherein, in the step of classifying the radio channels, the radio channels are classified into:
   flat channels, slow fading channels and fast fading channels;
   or the radio channels are classified into:
   slow fading channels and fast fading channels;
   or the radio channels are classified into:
   slow fading channels, fast fading channels and mutant channels;
   wherein the set of link adaptation modes includes: an instantaneous value prediction mode, a historical value prediction mode, a statistical quantile prediction mode and a mutation processing mode;
   the instantaneous value prediction mode is selected for flat channels, the historical value prediction mode is selected for slow fading channels, the statistical quantile prediction mode is selected for fast fading channels, and the mutation processing mode is selected for mutant channels;
   and wherein:

the instantaneous value prediction mode refers to taking a latest channel measurement result as a basis to select a link rate for use at a channel scheduling time;

the historical value prediction mode refers to using a curve fitting method to predict channel conditions at the channel scheduling time according to historical channel measurement results to select the link rate for use at the channel scheduling time;

the statistical quantile prediction mode refers to taking a certain quantile of a cumulative distribution function of the historical measurement results as the basis to select the link rate for use at the channel scheduling time;

the mutation processing mode refers to: clearing historical information, using an initial default channel prediction mode which is the historical value prediction mode or the instantaneous value prediction mode, and a selection of the link rate for use at the channel scheduling time is determined according to data reliability requirements.

2. The method of claim 1, wherein, in the step of classifying radio channels, the radio channels are classified based on a time-variant characteristic of the radio channels.

3. The method of claim 1, wherein the step of selecting the corresponding link adaptation mode according to the channel type comprises:

determining the channel type of the radio channel by analyzing historical measurement information of the radio channel, and selecting the corresponding link adaptation mode from the set of link adaptation modes according to the channel type.

4. The method of claim 3, wherein after the step of selecting the corresponding link adaptation mode according to the channel type, the method also comprises:

obtaining channel prediction information at a scheduling time according to the radio channel type and the corresponding link adaptation mode, and obtaining a link rate that matches the channel prediction information at the scheduling time.

5. An apparatus for link adaptation, comprising:

a classification module, which is configured to classify radio channels into different channel types;

a setting module, which is configured to set a set of link adaptation modes; and a mode selection module, which is configured to select a corresponding link adaptation mode for a radio channel from the set of link adaptation modes according to the channel type of the radio channel;

wherein the classification module is configured to classify the radio channels into:

flat channels, slow fading channels and fast fading channels;

or into:

slow fading channels and fast fading channels;

or into:

slow fading channels, fast fading channels and mutant channels;

wherein the set of link adaptation modes includes: an instantaneous value prediction mode, a historical value prediction mode, a statistical quantile prediction mode and a mutation processing mode, the mode selection module is configured to select the instantaneous value prediction mode for flat channels, select the historical value prediction mode for slow fading channels, select the statistical quantile prediction mode for fast fading channels, and select the mutation processing mode for mutant channels;

and wherein:

the instantaneous value prediction mode refers to taking a latest channel measurement result as a basis to select a link rate for use at a channel scheduling time;

the historical value prediction mode refers to using a curve fitting method to predict channel conditions at the channel scheduling time according to historical channel measurement results to select the link rate for use at the channel scheduling time;

the statistical quantile prediction mode refers to taking a certain quantile of a cumulative distribution function of the historical measurement results as the basis to select the link rate for use at the channel scheduling time;

the mutation processing mode refers to: clearing historical information, using an initial default channel prediction mode which is the historical value prediction mode or the instantaneous value prediction mode, and a selection of the link rate for use at the channel scheduling time is determined according to data reliability requirements.

6. The apparatus of claim 5, wherein the classification module is configured to classify the radio channels based on a time-variant characteristic of the radio channels.

7. The apparatus of claim 5, wherein the mode selection module is configured to select the corresponding link adaptation mode according to the channel type in a following way:

determining the channel type of the radio channel by analyzing historical measurement information of the radio channel, and selecting the corresponding link adaptation mode from the set of link adaptation modes according to the channel type.

8. The apparatus of claim 5, also comprising:

a channel learning module, which is configured to analyze and process historical measurement information of the radio channel to obtain the channel type; and a link rate determination module, which is configured to: obtain the channel prediction information at a scheduling time according to the channel type and the corresponding link adaptation mode, and obtain a link rate which matches the channel prediction information at the scheduling time.

* * * * *